United States Patent Office 3,344,863
Patented Oct. 3, 1967

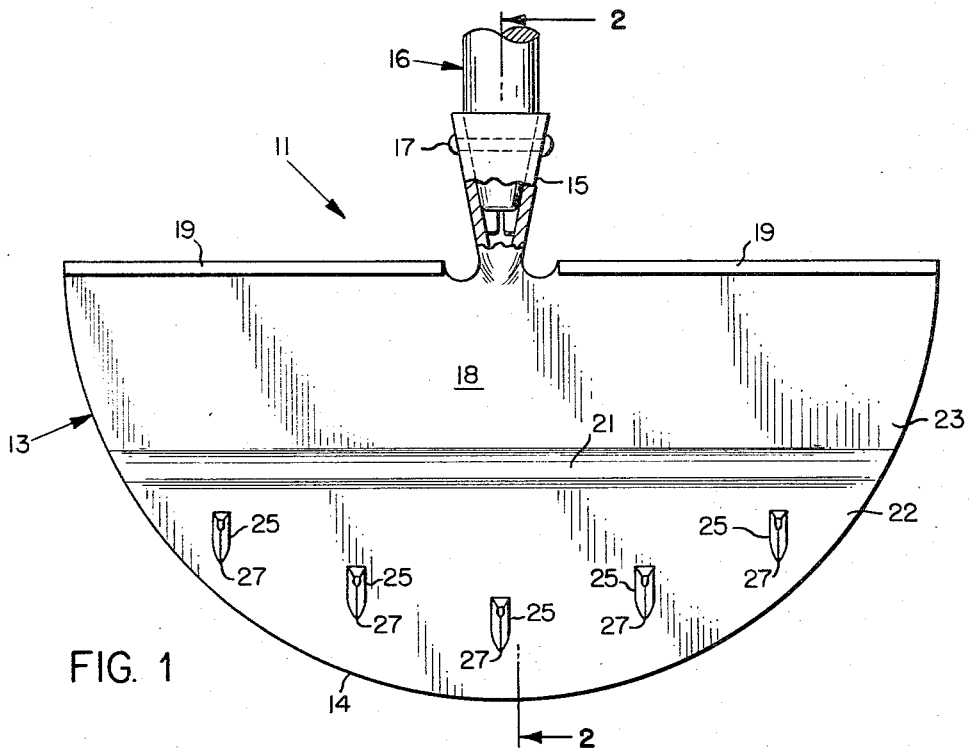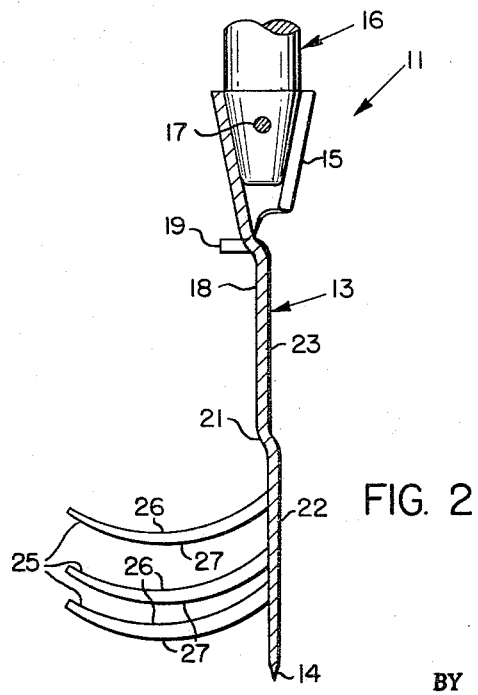
Oct. 3, 1967 — W. W. HASTINGS — 3,344,863
COMBINATION EDGER, SPADE, AND RAKE
Filed Nov. 9, 1964
FIG. 1
FIG. 2
INVENTOR.
WARREN W. HASTINGS
BY
ATTORNEY

3,344,863
COMBINATION EDGER, SPADE, AND RAKE
Warren W. Hastings, 271 Wilmot Road,
Rochester, N.Y. 14618
Filed Nov. 9, 1964, Ser. No. 409,806
4 Claims. (Cl. 172—14)

ABSTRACT OF THE DISCLOSURE

A gardening tool for use selectively in edging, raking or spading, comprises a semi-circular metal blade secured to the lower end of an elongate handle, and having a straight upper tread edge, a curved bottom edge, and an intermediate breaker portion below but parallel to the upper edge and inclined to the rest of the blade. A plurality of spaced tines, arranged in a curve project from one face of the blade above its bottom edge to break up soil, when the tool is used as a spade; the breaker portions turns over the soil. The tines permit use of the tool also as a rake, and the rounded bottom edge enables it to be used as an edger.

This invention relates to gardening tools, and more particularly, to tools for turning over and breaking up soil and for raking.

Edgers, rakes and spades are among the most common of garden tools. An edger has a thin, sharp blade and is used, for instance, to trim sod along the edge of a walk. A spade is used for turning soil and has a heavy, deeper blade. The common garden rake, of course, is used to spread and even soil and to gather leaves and other refuse from the surface of the soil. Normally, the edger, rake and spade are separate tools, each used to perform its own special job. A lawn can be edged with a spade, but because of the thickness of the blade of a spade this is a burdensome task. On the other hand, an edger cannot be used to turn over soil like a spade; and neither the edger nor the spade can be used for raking. Thus, the gardener has to buy and keep three tools to do his edging, spading, and raking.

But even with the three tools there are some limitations. For instance, a spade has to be used with great care around roses and other shrubs. If it is pushed down to full depth there is danger of cutting the roots of the plant.

One object of the present invention is to provide an improved gardening tool which will not only turn soil, but simultaneously will break up the soil.

Another object of the invention is to provide a tool which can be used either as an edger or as a spade.

Another object of this invention is to incorporate an edger and a rake into a single garden tool.

Another object of the invention is to provide a tool which can be used at will for edging, spading and raking. To this end it is a purpose of the invention to improve the ordinary edger so that it can be used also for turning over and breaking up soil, and for raking and spreading soil after spading and without changing tools.

Another object of this invention is to provide an improved, manually operable spading and edging tool having a blade to which clay or damp soil will not cling.

Other objects of the invention will be apparent hereinafter from the specification and from the recital of the appended claims, particularly when read inconjunction with the accompanying drawing.

In the drawing:

FIG. 1 is a fragmentary, front elevational view of a combination edger, spade, and rake made in accordance with one embodiment of this invention; and FIG. 2 is a fragmentary sectional view of this tool taken along the line 2—2 in FIG. 1 looking in the direction of the arrows.

Referring now to the drawing by numerals of reference, the combination tool shown comprises a blade 13 and a wooden handle 16 therefor.

The blade 13 is of generally semi-circular configuration like an edger; and has like an edger an arcuate, beveled cutting edge 14. Integral with the upper, straight, diametral edge of the blade, and projecting at opposite sides of the handle 16 outwardly over one face 18 of the blade, are two spaced, identically shaped flanges or treads 19, upon which the gardener can place a foot to sink the blade into the ground. Also integral with blade 13 between the flanges 19 is a socket 15, which projects vertically upwardly to receive and hold the lower end of the handle 16, which is secured therein by a rivet 17.

Substantially midway of its height the blade 13 is bent in dogleg fashion to form an inclined breaker portion 21, which extends parallel to the flanged, upper edge of the blade, and which provides an offset between the lower section 22 of the blade and the upper section 23 thereof.

Secured at their inner ends to the lower section 22 of the blade, and projecting forwardly from the face 18 of the blade, are a plurality of tines or forks 25. Each tine 25 is curved intermediate its ends to form thereon a concavedly shaped, arcuate upper surface 26 (FIG. 2), and a convexedly shaped, arcuate lower surface 27. The upper and lower surfaces 26 and 27, respectively, of each tine 25 are curved about different axes, which extend parallel to one another and to the chordal section 21, so that each tine 25 is thickest at its inner end (the end secured to the blade section 22). The underside of each prong 25 is sharpened so that its lower surface 27 is beveled along its length as shown more clearly in FIG. 1. The prongs 25 are preferably arranged about the lower end of the blade 13 in a curved, substantially parabolic path, which is not parallel to the bottom edge 14 of the blade. Also, each prong 25 is vertically spaced above the cutting edge 14.

For edging, the tool 11 is manipulated in the same manner as a conventional edger, i.e., the cutting edge 14 of the blade 13 is forced into the ground by stepping on one of the flanges or treads 19. The prongs or tines 25 are set far enough above the edge 14 not to interfere with functioning of the tool for this trimming purpose.

It is when the tool is used as a spade that its greatest advantage is achieved. The thin curved blade 13 penetrates the ground easily under pressure of the foot; and because of their parabolic arrangement, the prongs or tines 25 enter the ground progressively, rather than simultaneously. Moreover, since the downwardly facing lower edge of each tine 25 is beveled, and is convexedly shaped along its length, it enters the soil progressively along its length as the tool is forced into the ground, thereby presenting substantially the least possible resistance to soil penetration. The prongs break up the soil, thereby achieving a result not attainable with a spade, nor even with a spading fork. As the blade 13 penetrates the soil, moreover, the front face of the inclined breaker portion 21 not only separates any damp soil or clay, which might otherwise tend to cling to the front face of the blade; but also turns the soil over automatically. To turn over the soil with an ordinary spade or spading fork an extra manipulation is required.

In addition to its utility as an edging tool and as a/ spade, the tool of this invention can be employed as a rake. For use as a rake, the tool 11 is turned on its side and is manipulated, like a conventional rake, by using its handle 16 to draw the tines or prongs 25 in a combing motion across the surface of the ground. The parabolic arrangement of the tines 25 helps to gather leaves or stones toward the center of the parabolically arranged tines, thereby making it easier to gather the refuse into piles. Moreover, by arranging the tines parabolically about the lower edge of the blade 13 the effective width of the rake is increased, as compared to what it would be if the tines 25 were to be arranged in a circular arc about the cutting edge 14 of the blade.

From the foregoing it will be apparent that applicant has devised a simple, inexpensive, and compact tool, which is capable of forming the triple function of rake, edger, and spade. Thus, the gardener is saved the expense of buying three separate tools, and the need for dropping one tool and picking up another when, for instance, he is working in an area that requires spading, or edging and raking. Moreover, applicant has provided a tool which can do more than an ordinary spade. It can break up soil and turn it over in the one operation of sinking the tool into the ground. Furthermore, applicant has provided a tool which can be used for digging up a rose bed or around shrubs without danger of cutting the roots of the rose bushes or shrubs.

If desired alternate prongs or tines 25, or all of the tines 25, can be elongated to extend through the blade 13 so as to project beyond both faces of the blade.

While the invention has been described, then, in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:
1. A garden tool comprising
    (a) a rigid plate having
        (1) an upper section with a straight upper edge,
        (2) a lower section having a curved, beveled lower edge, and lying in a plane parallel to but offset with reference to said upper section,
        (3) an intermediate section connecting said upper and lower sections, and inclined to both sections, and extending parallel to said upper edge, and
    (b) a plurality of tines secured at their inner ends to said lower section to project outwardly from said plate adjacent the lower edge thereof and arranged in a curved path, and
    (c) a handle secured to and projecting upwardly from said plate.
2. A garden tool as defined in claim 1, wherein
    (a) said plate has an arcuately curved, lower edge,
    (b) said tines project outwardly from one side face of said plate and are arranged adjacent said lower edge in a curved, non-circular arcuate, upwardly-facing path, and
    (c) each of said tines is spaced inwardly from said lower edge.
3. A garden tool as defined in claim 2, wherein
each of said tines is curved longitudinally and has a convexly curved lower face and a concavely curved upper face, and has a sharp cutting edge on its underface.
4. A garden tool comprising
    (a) a metal plate having a straight upper edge, and an arcuately curved, lower edge which is beveled to form a cutting edge,
    (b) a plurality of spaced tines projecting outwardly from one side face of said plate and arranged adjacent said lower edge in a curved, non-circular arcuate, upwardly-facing path,
    (c) each of said tines being spaced inwardly from said lower edge and being curved longitudinally and having a convexly curved lower face and a concavely curved upper face and having a sharp cutting edge on its underface, and
    (d) means on said plate between said tines and said upper edge for separating moist soil from said plate as the lower edge thereof is forced down into the soil.

References Cited

UNITED STATES PATENTS

| 648,321 | 4/1900 | Westerberg | 294—49 |
| 850,228 | 4/1907 | Jackson | 56—400.5 |
| 1,043,758 | 11/1912 | Ferwerda | 56—400.5 |
| 2,245,692 | 6/1941 | Lamb | 172—378 X |

FOREIGN PATENTS

| 272,203 | 3/1914 | Germany. |

ABRAHAM G. STONE, *Primary Examiner.*

WILLIAM A. SMITH III, *Examiner.*

A. E. KOPECKI, *Assistant Examiner.*